United States Patent
Kawai et al.

(10) Patent No.: US 10,570,237 B2
(45) Date of Patent: Feb. 25, 2020

(54) (METH)ACRYLIC COPOLYMER, ADHESIVE COMPOSITION CONTAINING SAME, AND ADHESIVE SHEET

(71) Applicant: Mitsubishi Rayon Co., Ltd., Chiyoda-ku (JP)

(72) Inventors: Eri Kawai, Toyohashi (JP); Junichi Nakamura, Toyohashi (JP); Hiroko Shinada, Toyohashi (JP)

(73) Assignee: Mitsubishi Chemical Corporation, Tokyo (JP)

( * ) Notice: Subject to any disclaimer, the term of this patent is extended or adjusted under 35 U.S.C. 154(b) by 0 days.

(21) Appl. No.: 15/039,623

(22) PCT Filed: Nov. 28, 2014

(86) PCT No.: PCT/JP2014/081523
§ 371 (c)(1),
(2) Date: May 26, 2016

(87) PCT Pub. No.: WO2015/080244
PCT Pub. Date: Jun. 4, 2015

(65) Prior Publication Data
US 2017/0029548 A1 Feb. 2, 2017

(30) Foreign Application Priority Data
Nov. 29, 2013 (JP) .................................. 2013-248279

(51) Int. Cl.
*C08F 265/06* (2006.01)
*C09J 151/00* (2006.01)

(52) U.S. Cl.
CPC ......... *C08F 265/06* (2013.01); *C09J 151/003* (2013.01)

(58) Field of Classification Search
CPC .............................. C08F 265/06; C09J 151/00
See application file for complete search history.

(56) References Cited

U.S. PATENT DOCUMENTS

| | | | | |
|---|---|---|---|---|
| 5,006,582 A | * | 4/1991 | Mancinelli | C08F 290/046 524/271 |
| 5,252,395 A | * | 10/1993 | Maruoka | C09J 7/0217 428/355 AC |
| 6,472,463 B1 | * | 10/2002 | Ma | C08F 257/02 524/504 |
| 6,503,975 B1 | * | 1/2003 | Huybrechts | C08F 290/06 524/501 |
| 6,936,656 B2 | | 8/2005 | Muhlebach et al. | |
| 2001/0028959 A1 | | 10/2001 | Centner et al. | |
| 2002/0054996 A1 | | 5/2002 | Rheenen | |
| 2002/0064652 A1 | * | 5/2002 | Lau | C09J 151/00 428/355 EN |
| 2003/0166755 A1 | | 9/2003 | Muhlebach et al. | |

FOREIGN PATENT DOCUMENTS

| | | |
|---|---|---|
| CN | 1395587 A | 2/2003 |
| EP | 1160266 A1 | 12/2001 |
| EP | 3075809 A1 | 10/2016 |
| JP | S63-196676 A | 8/1988 |
| JP | S64-087678 A | 3/1989 |
| JP | H01-213379 A | 8/1989 |
| JP | H01-271471 A | 10/1989 |
| JP | H05-017726 A | 1/1993 |
| JP | H10-072513 A | 3/1998 |
| JP | H10-140122 A | 5/1998 |
| JP | H11-158450 A | 6/1999 |
| JP | 2003-517065 A | 5/2003 |
| JP | 2003-519703 A | 6/2003 |
| JP | 2004-509214 A | 3/2004 |
| JP | 2005-029745 A | 2/2005 |
| JP | 2009-102542 A | 5/2009 |
| JP | 2012-057012 A | 3/2012 |
| JP | 2012-184400 A | 9/2012 |
| JP | 2012184400 A * | 9/2012 |
| WO | 2001/044332 A1 | 6/2001 |
| WO | 2001/051534 A1 | 7/2001 |
| WO | 2002/022755 A2 | 3/2002 |
| WO | 2010/024186 A1 | 3/2010 |
| WO | 2011/152511 A1 | 12/2011 |

OTHER PUBLICATIONS

Extended European Search Report issued in counterpart European Patent Application No. 14865841.2 dated Aug. 30, 2016.
International Search Report issued in corresponding International Patent Application No. PCT/JP2014/081523 dated Mar. 3, 2015.
Office Action issued in counterpart Chinese Patent Application No. 201480065130.1 dated Dec. 4, 2017.
Office Action issued in counterpart Korean Patent Application No. 10-2016-7012602 dated Jun. 19, 2017.
Office Action issued in counterpart Korean Patent Application No. 10-2016-7012602 dated Dec. 1, 2017.
Office Communication issued in counterpart European Patent Application No. 14865841.2 dated Mar. 29, 2018.

* cited by examiner

*Primary Examiner* — Mark S Kaucher
(74) *Attorney, Agent, or Firm* — Morgan, Lewis & Bockius LLP

(57) ABSTRACT

A (meth)acrylic copolymer (A) having a mass average molecular weight of 50,000 to 1,000,000, in which the (meth)acrylic copolymer (A) is obtained by polymerizing a monomer mixture including a macromonomer (a) that has a number average molecular weight of 500 or more and less than 6000 and a vinyl monomer (b), and preferably includes 7 to 40% by mass of a repeat unit derived from the macromonomer (a), has sufficient coating workability, adhesive holding power and adhesive property as an adhesive composition.

17 Claims, No Drawings

(METH)ACRYLIC COPOLYMER, ADHESIVE COMPOSITION CONTAINING SAME, AND ADHESIVE SHEET

TECHNICAL FIELD

The present invention relates to a (meth)acrylic copolymer obtained by copolymerizing a macromonomer and an adhesive composition containing the same and an adhesive sheet.

BACKGROUND ART

Diverse copolymers having different physical properties have been conventionally synthesized by copolymerizing a vinyl monomer alone or a mixture of various vinyl monomers. Among them, a method of copolymerizing a mixture including two or more kinds of vinyl monomers, or mixing heterogeneous copolymers have been generally used since a polymer using a vinyl monomer alone cannot meet various requirements for the physical property. However, in a case where a mixture of various vinyl monomers is simply copolymerized, the properties possessed by each monomer unit tend to be averaged.

In addition, with only simple mixing of two or more kinds of copolymers, the copolymers were not intermingled with each other, and the properties were often worse than the property possessed by each monomer unit.

To solve these problems, investigations have been performed for a copolymer using a macromonomer. A macromonomer is a high molecular weight monomer having a polymerizable functional group. A copolymer obtained by copolymerizing a macromonomer has a feature that each property of the macromonomer moiety and the monomer unit copolymerized with the macromonomer is not impaired and individual property can be expressed. Consequently, this kind of copolymer using macromonomer is suggested variously, for example, also in the field of an adhesive.

For example, Patent Document 1 discloses an adhesive composition containing a copolymer, which is obtained by copolymerizing a macromonomer having a number average molecular weight of 2000 g/mole to 50,000 g/mole and an ethyleny unsaturated monomer, and is dispersed in an aqueous medium having a specific solid content.

In addition, Patent Document 2 discloses a resin composition for an adhesive obtained by copolymerizing an alkyl (meth)acrylate monomer and a macromonomer having a number average molecular weight of 1,000 to 200,000 and a glass transition temperature of 30 to 150° C.

CITATION LIST

Patent Document

Patent Document 1: WO 2002/022755 A
Patent Document 2: JP 11-158450 A

SUMMARY OF THE INVENTION

Problem to be Solved by the Invention

However, the copolymers of Patent Documents 1 and 2 have problems that the molecular weight of the obtained copolymer is too large and the copolymerization ratio with the macromonomer is not suitable, and thus sufficient coating workability is not obtained in various coating methods, and the obtained adhesive has a problem of not having sufficient holding power.

Means for Solving Problem

The present invention relates to a (meth)acrylic copolymer (A) having a weight average molecular weight of 50,000 to 1,000,000, in which the (meth)acrylic copolymer (A) is obtained by polymerizing a monomer mixture containing a macromonomer (a) that has a number average molecular weight of 500 or more but less than 6000 and a vinyl monomer (b).

In addition, the invention relates to an adhesive composition containing this (meth)acrylic copolymer (A).

Furthermore, the invention relates to an adhesive sheet using this adhesive composition.

Effect of the Invention

The (meth)acrylic copolymer (A) of the invention has each property of the macromonomer moiety and the monomer unit copolymerized with the macromonomer, and thus an adhesive composition using the present (meth)acrylic copolymer (A) can be coated with various coating methods such as a hot melt method in which a resin composition is heated as it is and coated, and a solution coating method in which a solvent is added and then a resin composition is coated. In addition, the obtained adhesive has sufficient adhesive force and holding power.

MODE(S) FOR CARRYING OUT THE INVENTION

Next, the invention will be described based on exemplary embodiments. However, the invention is not limited to the embodiments described below.

<Macromonomer (a)>

A macromonomer generally means a high molecular compound introduced with a polymerizable group at the terminal of the polymer. The number average molecular weight of the macromonomer (a) in the invention is 500 or more but less than 6,000. The number average molecular weight is preferably 800 to 5,500, and more preferably 1,000 to 4,500 from the relationship of the balance between adhesive force and coating property.

As the monomer composing the macromonomer, various monomers can be used. However, the monomer composing the macromonomer in the invention is preferably those having the structure of the following Formula (1) in which a polymerizable group is introduced to the terminal of the segment of the poly(meth)acrylic acid ester. Meanwhile, the "(meth)acrylic acid" in the invention represents "acrylic acid" or "methacrylic acid".

[Chemical Formula 1]

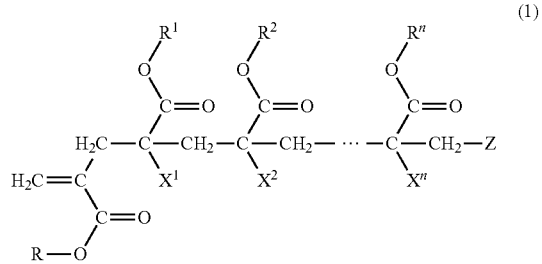

n is a natural number of 4 to 5,999.

Each of R and $R^1$ to $R^n$ in Formula (1) independently represents a hydrogen atom, an alkyl group, a cycloalkyl group, an aryl group or a heterocyclic group. The alkyl group, the cycloalkyl group, the aryl group or the heterocyclic group may have a substituent.

Examples of the alkyl group of R or $R^1$ to $R^n$ include a $C_{1-20}$ branched or linear alkyl group. Specific examples of the $C_{1-20}$ branched or linear alkyl group include a methyl group, an ethyl group, an n-propyl group, an i-propyl group, an n-butyl group, a t-butyl group, an i-butyl group, a pentyl group, a hexyl group, a heptyl group, an octyl group, a nonyl group, a decyl group, an undecyl group, a dodecyl group, a tridecyl group, a tetradecyl group, a pentadecyl group, a hexadecyl group, a heptadecyl group, an octadecyl group, a nonadecyl group and an icosyl group. Among them, the $C_{1-20}$ branched or linear alkyl group is preferably a methyl group, an ethyl group, an n-propyl group, an i-propyl group, an n-butyl group, a t-butyl group, a pentyl group, a hexyl group, a heptyl group or an octyl group, and more preferably a methyl group, an ethyl group, an n-propyl group, an i-propyl group, an n-butyl group and a t-butyl group from easy availability.

Examples of the cycloalkyl group of R or $R^1$ to $R''$ include a $C_{3-20}$ cycloalkyl group. Specific examples of the $C_{3-20}$ cycloalkyl group include a cyclopropyl group, a cyclobutyl group, a cyclopentyl group, a cyclohexyl group, a cycloheptyl group, a cyclooctyl group and an adamantyl group. The $C_{3-20}$ cycloalkyl group is preferably a cyclopropyl group, a cyclobutyl group and an adamantyl group from the availability.

Examples of the aryl group of R or $R^1$ to $R''$ include a $C_{6-18}$ aryl group. Specific examples of the $C_{6-18}$ aryl group include a phenyl group and a naphthyl group.

Examples of the heterocyclic group of R or $R^1$ to $R''$ include a $C_{5-18}$ heterocyclic group. Specific examples of the heterocyclic group of R or $R^1$ to $R''$ include a γ-butyrolactone group and a ε-caprolactone group.

Examples of the substituent that each group of R or $R^1$ to $R''$ may have include a group or atom selected from the group consisting of an alkyl group, an aryl group, a carboxyl group, an alkoxycarbonyl group (—COOR'), a cyano group, a hydroxyl group, an amino group (—NR'R''), an amide group (—CONR'R''), halogen, an allyl group, an epoxy group, an alkoxy group (—OR'), a siloxy group, or a group exhibiting hydrophilic or ionic property. Meanwhile, each of R' or R'' independently includes a hydrogen atom, an alkyl group, a cycloalkyl group and an aryl group similarly to R.

Examples of the alkoxycarbonyl group of the substituent include a methoxycarbonyl group.

Examples of the amino group of the substituent include an amino group, a monomethylamino group and a dimethylamino group. An N-methylcarbamoyl group and an N,N-dimethylcarbamoyl group are mentioned.

Examples of the amide group of the substituent include a carbamoyl group (—CONH$_2$), an N-methylcarbamoyl group (—CONHMe) and an N,N-dimethylcarbamoyl group (dimethyl amide group: —CONMe$_2$).

Examples of the halogen of the substituent include fluorine, chlorine, bromine and iodine.

Examples of the alkoxy group of the substituent include a $C_{1-12}$ alkoxy group, and specific examples of the alkoxy group include a methoxy group.

Examples of the group exhibiting hydrophilic or ionic property of the substituent include an alkali salt of a carboxyl group or an alkali salt of a sulfoxyl group, and a cationic substituent of a poly(alkylene oxide) group such as a polyethyleneoxide group and a polypropyleneoxide group, and a quaternary ammonium base.

R and $R^1$ to $R''$ are preferably at least one kind selected from an alkyl group and a cycloalkyl group, and more preferably an alkyl group.

Each of $X_1$ to $X_n$ independently represents a hydrogen atom or a methyl group.

For $X^1$ to $X^n$, a half or more of $X^1$ to $X^n$ are preferably methyl groups from the view point of easy synthesis of the macromonomer (a).

Z is the terminal group of the macromonomer (a). Examples of a terminal polymerizable functional group of the macromonomer include, a methacryloyl group, an acryloyl group, a vinyl group and a terminal polymerizable functional group represented by the following Formula (2), and the like.

[Chemical Formula 2]

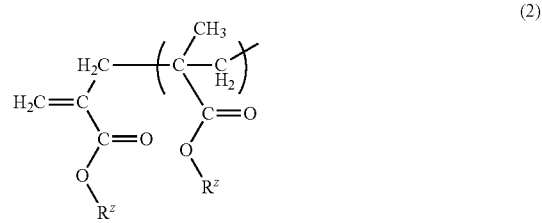

(2)

(In Formula (2), $R^z$ represents similar meanings to those of R, $R^1$ to $R''$ in Formula (1).)

Examples of the monomer for obtaining the macromonomer (a) include (meth)acrylic acid, methyl (meth)acrylate, ethyl (meth)acrylate, n-propyl (meth)acrylate, isopropyl (meth)acrylate, n-butyl (meth)acrylate, isobutyl (meth)acrylate, t-butyl (meth)acrylate, isoamyl (meth)acrylate, hexyl (meth)acrylate, octyl (meth)acrylate, laulyl (meth)acrylate, stearyl (meth)acrylate, hexadecyl (meth)acrylate, phenyl (meth)acrylate, benzyl (meth)acrylate, cyclohexyl (meth)acrylate, tetrahydrofurfluyl (meth)acrylate, isobornyl (meth)acrylate, 3,5,5-trimethylcyclohexyl(meth)acrylate, dicyclopentanyl (meth)acrylate, dicyclopentenyl (meth)acrylate, dicyclopentenyloxy ethyl (meth)acrylate, terpene acrylate and a derivative thereof, hydrogenated rosin acrylate and a derivative thereof, docosyl (meth)acrylate, glycidyl (meth)acrylate, 2-ethylhexyl (meth)acrylate, 2-hydroxyethyl (meth)acrylate, 2-hydroxypropyl (meth)acrylate, 2-hydroxybutyl (meth)acrylate, 3-hydroxybutyl (meth)acrylate, 4-hydroxybutyl (meth)acrylate, polyethylene glycol (meth)acrylate, polypropylene glycol (meth)acrylate, methoxyethyl (meth)acrylate, ethoxyethyl (meth)acrylate, n-butoxyethyl (meth)acrylate, isobutoxyethyl (meth)acrylate, t-butoxyethyl (meth)acrylate, phenoxyethyl (meth)acrylate, nonylphenoxyethyl (meth)acrylate, 3-methoxybutyl(meth) acrylate, (meth)acryloyl morpholine, "Placcel FM" (caprolactone-added monomer manufactured by DAICEL CORPORATION, trade name), "BLEMMER PME-100" (methoxypolyethylene glycol methacrylate manufactured by NOF CORPORATION (those having 2 linkages of ethylene glycol), trade name), "BLEMMER PME-200" (methoxypolyethylene glycol methacrylate manufactured by NOF CORPORATION (those having 4 linkages of ethylene glycol), trade name), "BLEMMER PME-400" (methoxypolyethylene glycol methacrylate manufactured by NOF CORPORATION (those having 9 linkages of ethylene glycol), trade name), "BLEMMER 50POEP-800B" (octoxypolyethylene glycol-polypropylene glycol-methacrylate manufactured by NOF CORPORATION (those having 8 linkages of ethylene glycol, those having 6 linkages of propylene glycol), trade name) and "BLEMMER 20ANEP-600" (nonyl phenoxy(ethylene glycol-polypropylene glycol) monoacrylate manufactured by NOF CORPORATION, trade name), "BLEMMER AME-100" (manufactured by NOF CORPO- RATION, trade name), "BLEMMER AME-200" (manufactured by NOF CORPORATION, trade name) and "BLEMMER 50AOEP-800B" (manufactured by NOF CORPORATION, trade name) Silapiane FM-0711 (manufactured by JNC CORPORATION, trade name), Silaplane FM-0721 (manufactured by JNC CORPORATION, trade name), Silaplane FM-0725 (manufactured by INC CORPORATION, trade name), Silaplane TM-0701 (manufactured by JNC CORPORATION, trade name), Silaplane TM4701T (manufactured by JNC CORPORATION, trade name) X-22-174DX (manufactured by Shin-Etsu Chemical Co., Ltd., trade name), X-22-2426 (manufactured by Shin-Etsu Chemical Co., Ltd., trade mine) and X-22-2475 (manufactured by Shin-Etsu Chemical Co., Ltd., trade name).

Among them, the monomer for obtaining the macromonomer (a) is preferably methacrylic acid ester from the point of glass transition temperature, easy polymerization and improvement of holding power. The monomer for obtaining the macromonomer (a) is further preferably methyl methacrylate, n-butyl (meth)acrylate, isobutyl (meth)acrylate, t-butyl (meth)acrylate, cyclohexyl (meth)acrylate, isobornyl (meth)acrylate, hydroxyethyl (meth)acrylate, and hydroxypropyl (meth)acrylate.

Glass Transition Temperature (Tga)

The glass transition temperature (Tga) of the macromonomer (a) in the invention is preferably 0 to 120° C. The glass transition temperature (Tga) of the macromonomer (a) is more preferably 10 to 110° C., and further preferably 30 to 100° C. from the point that sufficient holding power can be expressed when the (meth)acrylic copolymer (A) of the invention is used as an adhesive.

Meanwhile, Tga can be measured with differential scanning calorimetry (DSC).

Method of Preparing Macromonomer (a)

The macromonomer (a) can be prepared with a known method. Examples of the method of preparing the macromonomer (a) include a preparing method using a cobalt chain transfer agent, a method using an α substituted unsaturated compound such as an α-methyl styrene dimer as a chain transfer agent, a method by chemically binding a polymerizable group, and a method by thermal decomposition.

Among them, the method of preparing the macromonomer (a) is preferably a preparing method using a cobalt chain transfer agent in the point of the small number of preparing steps, and use of catalyst having a high chain-transfer constant. Meanwhile, the terminal polymerizable functional group of the macromonomer (a) in a case where the macromonomer (a) is manufactured using a cobalt chain transfer agent has the structure of Formula (2).

Examples of the method of preparing the macromonomer (a) using a cobalt chain transfer agent include a bulk polymerization method, a solution polymerization method, and an aqueous dispersion polymerization method such as a suspension polymerization method and an emulsification polymerization method. The method is preferably an aqueous dispersion polymerization method from the point of simple recovery process.

<Monomer Mixture>

The monomer mixture contains the macromonomer (a) and the vinyl monomer (b).

The content of the macromonomer (a) in the monomer mixture is preferably 7 to 40% by mass. If the content of the macromonomer (a) is 7% by mass or more, the holding power tends to become good when the (meth)acrylic copolymer (A) of the invention is used as an adhesive. If the content of the macromonomer (a) is 40% by mass or less, the coating property tends to become good. The content of the macromonomer (a) is preferably 8 to 30% by mass, and more preferably 9 to 20% by mass from the point of the holding power and the coating property of the adhesive.

<(Meth)acrylic Copolymer (A)>

The (meth)acrylic copolymer (A) is a copolymer which is obtained by polymerizing the monomer mixture including the macromonomer (a) and the vinyl monomer (b). As for the preparing method, the (meth)acrylic copolymer (A) can be prepared by a known polymerization method such as a solution polymerization method, a suspension polymerization method and an emulsification polymerization method. The preparing method in the invention is preferably a solution polymerization method since the (meth)acrylic copolymer (A) is used as an adhesive composition.

In the invention, the (meth)acrylic copolymer (A) may include at least one kind selected from a polymer having a repeat unit derived from macromonomer (a) only, a polymer having a repeat unit derived from one or two or more kinds of the vinyl monomer (b), unreacted macromonomer (a) and unreacted vinyl monomer (b).

Furthermore, the (meth)acrylic copolymer (A) includes at least one kind selected from a block copolymer having repeat units derived from the macromonomer (a) and the vinyl monomer (b), and a graft copolymer of a vinyl monomer having a repeat unit derived from the macromonomer (a) on the side chain.

Vinyl Monomer (b)

The vinyl monomer (b) used in the invention can use those equivalent to a monomer for obtaining the macromonomer (a). The vinyl monomer (b) is particularly preferably 2-ethylhexyl acrylate, n-octyl acrylate, isooctyl acrylate, n-butyl acrylate, ethyl acrylate or the like in the points that flexibility as an adhesive can be expressed, and water absorption of the (meth)acrylic copolymer (A) is suppressed due to hydrophobic property, and electric properties such as dielectric constant of the (meth)acrylic copolymer (A) can be adjusted.

Furthermore, in addition, the vinyl monomer (b) is preferably (meth)acrylic acid, hydroxyethyl (meth)acrylate and hydroxypropyl (meth)acrylate, methyl (meth)acrylate, styrene, isobornyl (meth)acrylate, cyclohexyl (meth)acrylate or the like.

Weight Average Molecular Weight

The weight average molecular weight of the (meth)acrylic copolymer (A) is 50,000 to 1,000,000. If the weight average molecular weight of the (meth)acrylic copolymer (A) is 50,000 or more, durability as an adhesive composition tends to become good. If the weight average molecular weight of the (meth)acrylic copolymer (A) is 1,000,000 or less, the coating property tends to become good. The weight average molecular weight of the (meth)acrylic copolymer (A) is preferably 120,000 to 700,000, and more preferably 150,000 to 500,000 from the point of the coating property.

Glass Transition Temperature (TgB)

In the invention, the glass transition temperature (TgB) of the copolymer (B) obtained by polymerizing the vinyl monomer (b) is preferably −100° C. to 10° C. to give flexibility of the adhesive resin composition at room temperature and moderate adhesive property (stickiness). TgB is more preferably −65° C. to 0° C. TgB is particularly preferably −60° C. to −10° C.

TgB means a value calculated by Fox's calculation formula from the glass transition temperature of a polymer obtained from a homopolymer of the monomer (b) and the compositional ratio.

Meanwhile, Fox's calculation formula is a calculation value obtained from the formula below, and can be obtained using the value described in Polymer HandBook [J. Brandrup, Interscience, 1989].

$$1/(273+Tg)=\Sigma(Wi/(273+Tgi))$$

[wherein Wi represents the weight fraction of the monomer i, and Tgi represents Tg(° C.) of the homopolymer of the monomer i]

Meanwhile, the glass transition temperatures (Tga) and (TgB) preferably have the relationship of the following Formula (3) from the point that each property of the macromonomer moiety and the monomer unit copolymerized with the macromonomer can be sufficiently expressed.

$$Tga>TgB \quad (3)$$

The relationship of the glass transition temperatures (Tga) and (TgB) is more preferably Tga−TgB>50° C., and most preferably Tga−TgB>80° C.

The melt viscosity at 130° C. of the (meth)acrylic copolymer (A) of the invention is preferably 20 to 800 Pa·s. If the melt viscosity at 130° C. is in the range described above, the resin composition can be coated by a hot melt method in which the resin composition is heated as it is and coated. Meanwhile, the melt viscosity can be measured, for example, using a viscoelasticity measurement apparatus Rheosol-G5000 manufactured by UBM. A viscosity ($\eta^*$) value measured at 0.7% distortion and 0.02 Hz at 130° C. using a 25 mm$\phi$ cone plate was taken as the value of the melt viscosity at 130° C. in the invention of the present application. The melt viscosity is preferably 20 to 600 Pa·s, more preferably 50 to 600 Pa·s, and further preferably 100 to 500 Pa·s from the point of the coating property.

The (meth)acrylic copolymer (A) of the invention has 100 or more of the holding power X represented by the following formula, and 3 N/25 mm or more of the peeling strength Y.

Holding power $X$=Holding time (40)/holding time (90)

The holding time (40) and the holding time (90) are measured at conditions of 20 mm×20 mm sticking surface and 0.5 kg load in accordance with JIS Z0237, and represent the holding time at 40° C. and the holding time at 90° C., respectively.

The peeling strength Y is measured as peeling strength for a glass base material at 180° peeling angle and 60 mm/min tension speed in accordance with JIS Z0237.

By satisfying the conditions, the (meth)acrylic copolymer (A) of the invention has excellent adhesive holding power and adhesive property when the (meth)acrylic copolymer (A) of the invention is used as an adhesive composition.

The (meth)acrylic copolymer (A) satisfying the conditions includes a (meth)acrylic copolymer having a weight average molecular weight of 50,000 to 1,000,000, which is obtained by polymerizing a monomer mixture including a macromonomer (a) that has a number average molecular weight of 500 or more and less than 6,000 and a vinyl monomer (b).

<Adhesive Composition>

The adhesive composition of the invention contains the (meth)acrylic copolymer (A).

The adhesive composition of the invention may contain a known component that is blended in an ordinary adhesive composition. For example, a filler can be added in order to impart heat-resisting property, thermal conductivity, fire-resisting property, electric conductivity and the like. Examples of the filler include an inorganic filler such as metal-based powders such as a zinc oxide powder and a titanium oxide powder, carbon black such as acetylene black, talc, a glass powder, a silica powder, a conducting particle and a glass powder; an organic filler such as a polyethylene powder, a polyester powder, a polyamide powder, a fluorine resin powder, a polyvinyl chloride powder, an epoxy resin powder and a silicone resin powder; and the like. These fillers can be used alone, or can be used in a mixture of two or more.

The (meth)acrylic copolymer (A) in this adhesive composition and a cross-linking agent can be cross-linked by ultraviolet irradiation or the like to give an adhesive sheet. Examples of the cross-linking method can include a method in which a cross-linking agent, which can bind chemically to a reactive group such as a hydroxyl group introduced into the (meth)acrylic copolymer (A), is added, and reacted by heating or curing, and a method in which a multifunctional (meth)acrylate having two or more (meth)acryloyl groups or acrylate introduced with a nitrogen atom or the like as a cross-linking agent and a reaction initiator such as a photoinitiator are added and reacted.

Furthermore, the (meth)acrylic copolymer (A) can be introduced with a functional group, and blended with a cross-linking agent or a polymerization initiator to give an adhesive composition, or a cross-linked adhesive sheet. Examples of the cross-linking agent include isocyanate-based cross-linking agents, epoxy-based cross-linking agents, metal chelate-based cross-linking agents, photocuring-based cross-linking agents and the like, melamine-based cross-linking agents, aziridine-based cross-linking agents and the like, which can be used in combination.

Examples of the isocyanate-based cross-linking agent include aromatic polyisocyanate such as xylylene diisocyanate, diphenyl methane diisocyanate, triphenyl methane triisocyanate and tolylene diisocyanate, aliphatic or alicyclic polyisocyanate such as hexamethylene diisocyanate, isophorone diisocyanate and a hydrogen added product of the aromatic polyisocyanate, a dimer or trimer of the polyisocyanate, an adduct consisting of the polyisocyanate and polyol such as trimethylol propane, and the like, which can be used alone respectively, or can be used in combination of two or more.

Examples of the epoxy-based cross-linking agent include ethylene glycol diglycidyl ether, polyethylene glycol diglycidyl ether, 1,6-hexanecliol diglycidyl ether, bisphenol A type epoxy resin, N,N,N',N'-tetraglycidyl-m-xylenediamine, 1,3-bis(N,N-cliglycidylamino methyl) cyclohexane, N,N-diglycidylaniline, N,N-diglycidyltoluidine and the like.

Examples of the metal chelate compound include compounds in which a polyvalent metal is bonded to an organic compound by covalent binding or coordinate binding. Examples of the polyvalent metal include aluminum, nickel, chrome, copper, iron, tin, titanium, zinc, cobalt, manganese, zirconium and the like.

In addition, examples of the organic compound bonded by covalent binding or coordinate binding include those having oxygen such as a ketone compound such as acetyl acetone, alkyl ester, an alcohol compound, a carboxylic acid compound, an ether compound, and the like.

As for the photocuring-based cross-linking agent, a multifunctional (meth)acrylate having two or more (meth)acryloyl groups as a cross-linking agent and a reaction initiator such as a photoinitiator can be added, and cross-linked by ultraviolet irradiation and the like. Examples of this kind of cross-linking agent include, a multifunctional (meth)acrylate having two or more (meth)acryloyl groups; or a multifunctional, organic functional group resin having two or more organic functional groups such as an isocyanate group, an epoxy group, a melamine group, a glycol group, a siloxane group and an amine; or an organic metal compound having a metal complex such as zinc, aluminum, sodium, zirconium and calcium; a multifunctional (meth)acrylate such as triethylene glycol diacrylate, polyalkylene glycol diacrylate, bisphenol A-EO/PO modified diacrylate, alkoxylated hexanediol diacrylate, polyisobutylene diacrylate, alkoxylated trimethylol propane triacrylate, alkoxylated pentaerythritol triacrylate, alkoxylated pentaerythritol tetraacrylate, alkoxylated dipentaerythritol pentaacrylate, caprolactone modified dipentaerythritol penta and hexaacrylate, and the like.

In addition, various additives such as an adhesion-imparting resin, an antioxidant, a light stabilizer, a metal deactivator, an age resistor, a moisture absorbent, an antirust agent and a hydrolysis resistant can be suitably contained as necessary. A reaction catalyst (a tertiary amine-based compound, a quaternary ammonium-based compound, a lauric acid tin compound and the like) can be also suitably contained.

Examples of the kind of the antioxidant include phenol-based compounds, phosphorus-based compounds, hydroxyl amine-based compounds, sulfur-based compounds and the like. Among them, the antioxidant is preferably a phenol-based compound or a phosphoric acid-based compound, which has small staining of the resin after heating. They can be used alone, or used in combination of several kinds. The blend amount of the antioxidant is preferably in a range of 0.1 to 5 mass parts relative to the (meth)acrylic copolymer.

The present adhesive resin composition can be subjected to sheet molding and used as an adhesive sheet.

The adhesive sheet can be coated in the state of a solution using a solvent, and can be prepared as a hot melt-based adhesive composition without use of a solvent. When the adhesive sheet is prepared as a hot melt-based adhesive composition without use of a solvent, the adhesive sheet can be given more thickness in comparison to an adhesive composition using a solvent, and thus, for example, can be given an enough thickness to fill a gap between constructional elements of an image display device.

Furthermore, the adhesive sheet obtained in the invention can be used in adhesion of various base materials, and also expresses very good adhesive performance. For example, by being applied to a transparent plastic film, or being processed to an adhesive film form, the adhesive sheet obtained in the invention can be used in sticking a window sticking film for a vehicle or construction, or sticking a label in labelling. In addition, by being processed to a transparent double-sided adhesive sheet form, the adhesive sheet obtained in the invention can be used in sticking various panels in a display such as a liquid crystal panel, or sticking a transparent plate such as glass, and the like.

EXAMPLES

Examples and Comparative Examples are shown below, and the adhesive resin composition of the invention is described further in detail. However, the invention is not limited thereto. Meanwhile, "part" in present Examples means "mass part".

<Synthesis of Macromonomer (a-1)>
<Preparation of Dispersion 1>

900 Parts of deionized water, 60 parts of sodium 2-sulfoethyl methacrylate, 10 parts of potassium methacrylate and 12 parts of methyl methacrylate (MMA) were put into a polymerization apparatus provided with a stirrer, a cooling tube and a thermometer, and stirred, and heated to 50° C. while substituting the inside of the polymerization apparatus with nitrogen. 0.08 Parts of 2,2'-azobis(2-methyl propioneamidine) dihydrochloride as a polymerization initiator were added into the polymerization apparatus, and further heated to 60° C. After the heating, MMA was continuously dropped for 75 minutes at a speed of 0.24 parts/minute using a dropping pump. The reaction solution was kept at 60° C. for 6 hours and then cooled to room temperature, to give Dispersion 1 having 10% by mass of the solid content, which is a transparent aqueous solution.

145 Parts of deionized water, 0.1 part of sodium sulfate and 0.25 parts of Dispersion 1 (10% by mass of the solid content) were put into a polymerization apparatus provided with a stirrer, a cooling tube and a thermometer, and stirred to give a uniform aqueous solution. Next, 100 parts of MMA, 0.008 parts of bis[(difluoroboryl)diphenyl glyoximate] cobalt (II) as a chain transfer agent and 0.8 parts of "PEROCTA" (trade name) O (1,1,3,3-tetramethyl butyl peroxy2-ethyl hexanoate, manufactured by NOF CORPORATION) as a polymerization initiator were added, to give an aqueous suspension.

Next, the inside of the polymerization apparatus was substituted with nitrogen, heated to 80° C. and reacted for one hour, and heated to 90° C. and kept for one hour in order to further increase the polymerization ratio. Then, the reaction solution was cooled to 40° C., to give an aqueous suspension including the macromonomer. This aqueous suspension was filtered, and the residue was washed with deionized water, dehydrated, and dried at 40° C. for 16 hours, to give the macromonomer (a-1). The number average molecular weight of this macromonomer (a-1) was 1400, and the glass transition temperature by DSC measurement was 55° C.

<Preparation of Macromonomers (a-2) to (a-9)>

Macromonomers (a-2) to (a-9) were prepared with a similar method to that of the macromonomer (a-1) except that the charge-in quantities (parts) of the monomer, the polymerization initiator and the chain transfer agent added to Dispersion 1 were changed to those shown in Table 1. The number average molecular weight (Mn) of the obtained macromonomer (a) and the glass transition temperature (Tga) are shown in Table 1 together.

TABLE 1

| | Monomer (a) | | | | | | | | |
| --- | --- | --- | --- | --- | --- | --- | --- | --- | --- |
| | a-1 | a-2 | a-3 | a-4 | a-5 | a-6 | a-7 | a-8 | a-9 |
| MMA | 100 | 100 | 100 | 100 | 100 | 100 | 100 | 100 | 50 |
| IBXMA | — | — | — | — | — | — | — | — | 50 |
| Polymerization initiator (parts) | 0.8 | 0.45 | 0.43 | 0.4 | 0.35 | 0.2 | 0.15 | 1.3 | 0.5 |
| Chain transfer agent (parts) | 0.008 | 0.0045 | 0.0043 | 0.004 | 0.0035 | 0.002 | 0.0015 | 0.013 | 0.005 |

TABLE 1-continued

| | | a-1 | a-2 | a-3 | a-4 | Monomer (a)<br>a-5 | a-6 | a-7 | a-8 | a-9 |
|---|---|---|---|---|---|---|---|---|---|---|
| Physical | Mn | 1400 | 1900 | 2100 | 2500 | 3000 | 5100 | 7000 | 1000 | 2600 |
| property | Tga (° C.) | 55 | 73 | 77 | 80 | 90 | 95 | 105 | 44 | 92 |

MMA: Methyl methacrylate
IBXMA: Isobornyl methacrylate (Evaluation Method)
Glass Transition Temperature (Tga) of Macromonomer (a)
Glass transition temperature (Tga) of the macromonomer (a) was measured at a heating speed of 5° C./minute under nitrogen atmosphere using a differential scanning calorimeter (DSC SmartRoader manufactured by Rigalcu). Meanwhile, aluminum oxide was used as a standard substance.

Molecular Weights of Macromonomer (a) and Acrylic Copolymer (A)
Macromonomer (a)
The molecular weight of the macromonomer (a) was measured using gel permeation chromatography (GPC) (HLC-8320 manufactured by TOSOH CORPORATION). A tetrahydrofuran solution of the macromonomer (a) was adjusted to 0.2% by mass and then 10 µl of the solution was injected to an apparatus equipped with a column manufactured by TOSOH CORPORATION (TSKgel SuperHZM-M×HZM-M×HZ2000, TSKguardcolumn SuperHZ-L), and the molecular weight was measured at conditions of flow rate: 0.35 ml/minute, eluting solvent: tetrahydrofuran (stabilizer BHT) and column temperature: 40° C., and the number average molecular weight (Mn) was calculated as conversion to standard polystyrene.

Acrylic Copolymer (A)
The molecular weight of the acrylic copolymer (A) was measured using gel permeation chromatography (GPC) (HLC-8120 manufactured by TOSOH CORPORATION). A tetrahydrofuran solution of the acrylic copolymer (A) was adjusted to 0.3% by mass and then 20 µl of the solution was injected into an apparatus equipped with a column manufactured by TOSOH CORPORATION (TSKgel SuperHM-H*4, TSKguardcolumn SuperH-H), and the molecular weight was measured at conditions of flow rate: 0.6 ml/minute, eluting solvent: tetrahydrofuran (stabilizer BHT) and column temperature: 40° C., and the weight average molecular weight (Mw) was calculated as conversion to standard polystyrene.

Transparency
The resin solution after polymerization was solvent-dehydrated with drying under reduced pressure, and the resultant is picked in a 200 mL transparent wide-mouth screwed bottle, and observed by the naked eyes under scattering daylight. A case where the resultant is transparent and no contaminant or isolation is admitted, was indicated as "◯", and a case where any of cloudiness, contaminant, isolation and the like is observed, is indicated as "x".

Evaluation for Coating Property (Melt Viscosity at 130° C.)
The coating property was measured using a viscoelasticity measurement apparatus Rheosol-G5000 manufactured by UNIVERSAL BUILDING MATERIALS MERCHANTS CO. LTD., and the value of the viscosity (η*) measured at 130° C., 0.7% distortion and 0.02 Hz using a 25 mm φ cone plate was assumed as the value of the melt viscosity at 130° C., and the coating property was rated according to the following criteria.
No more than 500 Pa·s: ◯
More than 500 Pa·s and no more than 800 Pa·s: Δ
More than 800 Pa·s: x
Test and Evaluation for Holding Power
In accordance with JIS Z0237, double sides of the acrylic copolymer (A) were sandwiched between peeling films and made to a sheet, and one of the peeling films was peeled off, and a polyethylene terephthalate film (hereinafter, referred to as the PET film) was crimped instead with a 2 kg hand roller. This was cut to a strip form of 20 mm×100 mm. The other peeling film was peeled off, and the acrylic copolymer (A) was horizontally stuck on a 30 mm×100 mm SUS plate using a 2 kg hand roller so that the sticking face was 20×20 mm. The acrylic copolymer (A) was cured for 30 minutes at 40° C. and then the PET film was loaded with a weight of 0.5 kg on the tip, and the holding time was measured in 40° C. constant temperature zone. The holding power was rated according to the following criteria.
Holding time is
30 minutes or more: ⊙
5 minutes or more and less than 30 minutes: ◯
Less than 5 minutes: x
In addition, with changing the temperature to 90° C. (50% relative humidity), the holding time was measured similarly. Overall holding power was evaluated by the following Formula.

(Holding time at 40° C.)/(holding time at 90° C.)=$X$

Rating is as follows.
X≥230: ⊙
230>X≥200: ◯
200>X≥100: Δ
100>X: x
Adhesive Property Test
The peeling strength Y for a glass base material was measured at 180° peeling angle and 60 mm/min tension speed in accordance with JIS Z0237. In addition, the peeled face of the glass base material was visually observed, and the presence or absence of the adhesive residue was checked. The adhesive force was rated according to the following criteria.
Y≥3N/25 mm, and absence of adhesive residue: ◯
Y≥3N/25 mm, and presence of adhesive residue: Δ
Y<3N/25 mm: x Preparation Example 1

<Preparation of (Meth)Acrylic Copolymer (A-1)>
Into a four-neck flask provided with a stirring device, a thermometer, a cooling tube and an opening for nitrogen gas introduction, 40 parts of ethyl acetate as a charge solvent and 10 parts of the macromonomer (a-1) were charged, and heated to 85° C. under nitrogen gas aeration. After the temperature reached 85° C., a mixture including 20 parts of ethyl acetate, 90 parts of n-butyl acrylate and 0.04 parts of benzoyl peroxide was dropped over 4.5 hours. The reaction solution was kept for one hour after completion of the dropping, and then a mixture including 0.5 parts of "PEROCTAO" and 10 parts of ethyl acetate was added over one hour. Then, the reaction solution was kept for 2 hours, and then added with 0.5 parts of "IRGANOX 1010" (trade name, manufactured by BASF) as an antioxidant and 20.5 parts of ethyl acetate, and then cooled to room temperature to give a (meth)acrylic copolymer (A-1).

Preparation Examples 2 to 21

<Preparation of (Meth)Acrylic Copolymers (A-2) to (A-21)>

(Meth)acrylic copolymers (A-2) to (A-21) were obtained in a similar manner to Preparation Example 1 except that the composition of the monomer mixture (the macromonomer (a) and the vinyl monomer (b)) and the initial charge solvent used were changed to Table 2.

Meanwhile, (A-12) is an example where the macromonomer (a) was not used.

TABLE 2

| | | | Preparation Example | | | | | | | | | | |
|---|---|---|---|---|---|---|---|---|---|---|---|---|---|
| | | | 1 | 2 | 3 | 4 | 5 | 6 | 7 | 8 | 9 | 10 | 11 |
| | (Meth)acrylic copolymer (A) | | A-1 | A-2 | A-3 | A-4 | A-5 | A-6 | A-7 | A-8 | A-9 | A-10 | A-11 |
| Monomer mixture | Macromonomer (a) (parts) | a-1 | 10 | — | — | — | — | — | — | — | — | — | — |
| | | a-2 | — | 15 | — | — | — | — | — | — | — | — | — |
| | | a-3 | — | — | 15 | — | — | — | — | — | — | — | — |
| | | a-4 | — | — | — | 10 | 10 | 15 | 7 | — | 11 | — | — |
| | | a-5 | — | — | — | — | — | — | — | 15 | — | — | — |
| | | a-6 | — | — | — | — | — | — | — | — | — | 10 | — |
| | | a-7 | — | — | — | — | — | — | — | — | — | — | — |
| | | a-8 | — | — | — | — | — | — | — | — | — | — | — |
| | | a-9 | — | — | — | — | — | — | — | — | — | — | — |
| | | AA-6 | — | — | — | — | — | — | — | — | — | — | 10 |
| | Vinyl monomer (b) (parts) | MMA | — | — | — | — | — | — | — | — | — | — | — |
| | | n-BA | 90 | 81 | 81 | 90 | 86 | 81 | 93 | 81 | — | 90 | 90 |
| | | 2-EHA | — | — | — | — | — | — | — | — | 86 | — | — |
| | | CHMA | — | — | — | — | — | — | — | — | — | — | — |
| | | AA | — | 4 | 4 | — | 4 | 4 | — | 4 | 3 | — | — |
| | | 2-HEMA | — | — | — | — | — | — | — | — | — | — | — |
| | | TgB (° C.) | −49 | −45 | −45 | −49 | −45 | −45 | −49 | −45 | −50 | −49 | −49 |
| Initial charge solvent (parts) | | EtOAc | 40 | 40 | 40 | 40 | 40 | 40 | 40 | 40 | 40 | 40 | 40 |
| | | IPA | — | 1.7 | 2.5 | 4 | 4 | 4.5 | 3 | 4.5 | 7 | 12 | — |
| Weight average molecular weight (ten thousand) | | | 40 | 30 | 27 | 25 | 23 | 23 | 31 | 24 | 8 | 9.4 | 12.6 |

| | | | Preparation Example | | | | | | | | | |
|---|---|---|---|---|---|---|---|---|---|---|---|---|
| | | | 12 | 13 | 14 | 15 | 16 | 17 | 18 | 19 | 20 | 21 |
| | (Meth)acrylic copolymer (A) | | A-12 | A-13 | A-14 | A-15 | A-16 | A-17 | A-18 | A-19 | A-20 | A-21 |
| Monomer mixture | Macromonomer (a) (parts) | a-1 | — | — | — | — | 20 | — | — | — | — | — |
| | | a-2 | — | — | — | — | — | — | — | — | — | — |
| | | a-3 | — | — | — | — | — | — | — | — | — | — |
| | | a-4 | — | — | 11 | 10 | — | — | 20 | 20 | 20 | — |
| | | a-5 | — | — | — | — | — | — | — | — | — | — |
| | | a-6 | — | — | — | — | — | — | — | — | — | — |
| | | a-7 | — | 10 | — | — | — | — | — | — | — | — |
| | | a-8 | — | — | — | — | — | 20 | — | — | — | — |
| | | a-9 | — | — | — | — | — | — | — | — | — | 10 |
| | | AA-6 | — | — | — | — | — | — | — | — | — | — |
| | Vinyl monomer (b) (parts) | MMA | 10 | — | — | — | — | — | — | — | — | — |
| | | n-BA | 90 | 90 | 79 | 85.9 | 80 | 80 | 80 | 80 | 80 | 80 |
| | | 2-EHA | — | — | — | — | — | — | — | — | — | — |
| | | CHMA | — | — | 10 | — | — | — | — | — | — | — |
| | | AA | — | — | — | 4 | — | — | — | — | — | — |
| | | 2-HEMA | — | — | — | 0.1 | — | — | — | — | — | — |
| | | TgB (° C.) | −39 | −49 | −39 | −45 | −49 | −49 | −49 | −49 | −49 | −49 |
| Initial charge solvent (parts) | | EtOAc | 40 | 40 | 40 | 70 | 40 | 20 | 40 | 40 | 40 | 40 |
| | | IPA | 7 | 18 | 7 | — | — | — | 5 | 7 | 15 | 4 |
| Weight average molecular weight (ten thousand) | | | 23 | 8.5 | 8 | 34 | 30 | 29 | 18 | 14 | 8 | 24 |

AA-6: Macromonomer manufactured by TOAGOSEI CO., LTD., product name, Mn = 6000
MMA: Methyl methacrylate
n-BA: n-butyl acrylate
2-EHA: -2-ethylhexyl acrylate
CHMA: Cyclohexyl methacrylate
AA: Acrylic acid
2-HEMA: -2-hydroxyethyl methacrylate
EtOAc: Ethyl acetate
IPA: Isopropyl alcohol Examples 1 to 19 and Comparative Examples 1 to 3

The melt viscosity at 130° C., the transparency, the holding power and the adhesive force of the (meth)acrylic copolymer (A-1) prepared in Preparation Example 1 were measured, and the results are shown in Table 3. Similarly, similar measurements were performed for the (meth)acrylic copolymers (A-2 to A-21) of Preparation Examples 2 to 21 similarly (Tables 3 and 4). Meanwhile, Example 11 represents an example where a (meth)acrylic copolymer (A-4) was used, and the coating method was changed to a hot melt method.

TABLE 3

|  |  | Example 1 | Example 2 | Example 3 | Example 4 | Example 5 | Example 6 |
|---|---|---|---|---|---|---|---|
|  | (Meth)acrylic copolymer | A-1 | A-2 | A-3 | A-4 | A-5 | A-6 |
| Coating property | Melt viscosity at 130° C. (Pa · s) | 200 | 260 | 230 | 230 | 230 | 280 |
|  | Rating | ◯ | ◯ | ◯ | ◯ | ◯ | ◯ |
|  | Coating method | Solution coating | Solution coating | Solution coating | Solution coating | Solution coating | Solution coating |
|  | Transparency | ◯ | ◯ | ◯ | ◯ | ◯ | ◯ |
| Holding power of 0.5 Kg at 40° C. | Time | 10 min | 18 h | >24 h | >24 h | >24 h | >24 h |
|  | Rating | ◯ | ⊙ | ⊙ | ⊙ | ⊙ | ⊙ |
| Holding power of 0.5 Kg at 90° C. | Time (s) | 2 | 15 | 18 | 10 | 14 | 22 |
| X | 40° C./90° C. Ratio | 300 | 4320 | 4800 | 8640 | 6171 | 3927 |
|  | Overall evaluation for holding power | ⊙ | ⊙ | ⊙ | ⊙ | ⊙ | ⊙ |
| Adhesive force | Y (N/25 mm) | 20 | 15 | 14 | 10 | 8 | 14 |
|  | Adhesive residue | Presence | Absence | Absence | Absence | Absence | Absence |
|  | Rating | ◯ | ⊙ | ⊙ | ⊙ | ⊙ | ⊙ |

|  |  | Example 7 | Example 8 | Example 9 | Example 10 | Example 11 |
|---|---|---|---|---|---|---|
|  | (Meth)acrylic copolymer | A-7 | A-8 | A-9 | A-10 | A-4 |
| Coating property | Melt viscosity at 130° C. (Pa · s) | 400 | 500 | 490 | 270 | 230 |
|  | Rating | ◯ | ◯ | ◯ | ◯ | ◯ |
|  | Coating method | Solution coating | Solution coating | Solution coating | Solution coating | Hot melt |
|  | Transparency | ◯ | ◯ | ◯ | ◯ | ◯ |
| Holding power of 0.5 Kg at 40° C. | Time | 20 h | >24 h | 10 h | 77 min | >24 h |
|  | Rating | ⊙ | ⊙ | ⊙ | ⊙ | ⊙ |
| Holding power of 0.5 Kg at 90° C. | Time (s) | 6 | 330 | 20 | 10 | 12 |
| X | 40° C./90° C. Ratio | 12000 | 262 | 1900 | 462 | 7200 |
|  | Overall evaluation for holding power | ⊙ | ⊙ | ⊙ | ⊙ | ⊙ |
| Adhesive force | Y (N/25 mm) | 7 | 11 | 4 | 5 | 11 |
|  | Adhesive residue | Absence | Absence | Absence | Presence | Absence |
|  | Rating | ◯ | ◯ | ◯ | Δ | ◯ |

TABLE 4

|  |  | Example 12 | Example 13 | Example 14 | Example 15 | Example 16 | Example 17 |
|---|---|---|---|---|---|---|---|
|  | (Meth)acrylic copolymer | A-14 | A-15 | A-16 | A-17 | A-18 | A-19 |
| Coating property | Melt viscosity at 130° C. (Pa · s) | 500 | 500 | 90 | 80 | 270 | 150 |
|  | Rating | ◯ | ◯ | ◯ | ◯ | ◯ | ◯ |
|  | Coating method | Solution coating | Solution coating | Solution coating | Solution coating | Solution coating | Solution coating |
|  | Transparency | ◯ | ◯ | ◯ | ◯ | ◯ | ◯ |
| Holding power of 0.5 Kg at 40° C. | Time | 4 h | >24 h | 1 h | 7 min | >24 h | 12 h |
|  | Rating | ⊙ | ⊙ | ⊙ | ◯ | ⊙ | ⊙ |
| Holding power of 0.5 Kg at 90° C. | Time (s) | 16 | 18 | 4 | 2 | 144 | 10 |
| X | 40° C./90° C. Ratio | 900 | 4800 | 900 | 210 | 600 | 4320 |
|  | Overall evaluation for holding power | ⊙ | ⊙ | ⊙ | ◯ | ⊙ | ⊙ |
| Adhesive force | Y (N/25 mm) | 3 | 8 | 35 | 47 | 8 | 8 |
|  | Adhesive residue | Absence | Absence | Presence | Presence | Absence | Absence |
|  | Rating | ◯ | ◯ | Δ | Δ | ⊙ | ⊙ |

TABLE 4-continued

|  |  | Example 18 | Example 19 | Comparative Example 1 | Comparative Example 2 | Comparative Example 3 |
|---|---|---|---|---|---|---|
|  | (Meth)acrylic copolymer | A-20 | A-21 | A-11 | A-12 | A-13 |
| Coating property | Melt viscosity at 130° C. (Pa · s) | 60 | 280 | 580 | 250 | 250 |
|  | Rating | ◯ | ◯ | Δ | ◯ | ◯ |
|  | Coating method | Solution coating | Solution coating | Solution coating | Solution coating | Solution coating |
|  | Transparency | ◯ | ◯ | X | ◯ | ◯ |
| Holding power of 0.5 Kg at 40° C. | Time | 5 h | >24 h | 20 min | 1 min | 38 min |
|  | Rating | ⊙ | ⊙ | ◯ | X | ◯ |
| Holding power of 0.5 Kg at 90° C. | Time (s) | 9 | 15 | 1 | 1 | 13 |
| X | 40° C./90° C. Ratio | 2000 | 5760 | 1200 | 60 | 175 |
|  | Overall evaluation for holding power | ⊙ | ⊙ | ⊙ | X | Δ |
| Adhesive force | Y (N/25 mm) | 8 | 8 | 2 | 4 | 2 |
|  | Adhesive residue | Absence | Absence | Presence | Presence | Presence |
|  | Rating | ⊙ | ⊙ | X | Δ | X |

In [Example 1] to [Example 19], the (meth)acrylic copolymers exhibited good coating property and holding power as an adhesive. On the other hand, in [Comparative Example 1], the (meth)acrylic copolymer (A-11) using a commercial one having a number average molecular weight of 6000 of the macromonomer (a) had high melt viscosity at 130° C., and poor coating property. In addition, the transparency was also bad, and the adhesive force was poor. In [Comparative Example 2], the (meth)acrylic copolymer (A-12) not using the macromonomer (a) was used. In [Comparative Example 3], the number average molecular weight of the macromonomer (a) was large as 7000, and the total evaluation of the holding powers of the (meth)acrylic copolymer (A-13) using this was slightly reduced, and further the adhesive force was deteriorated.

Examples 20 to 23

The adhesive compositions of the compositions shown in Table 5 were cured or cross-linked by ultraviolet irradiation or the like. This case also had good holding power and adhesive force.

[Curing Condition]

Apparatus: 2P curing apparatus, light source: metal halide lump, irradiation intensity: 100 mW/cm², irradiation amount: 3000 mJ/cm²

TABLE 5

|  |  | Example 20 | Example 21 | Example 22 | Example 23 |
|---|---|---|---|---|---|
| Adhesive composition | A-4 | 30 |  |  |  |
|  | A-6 |  | 100 | 100 |  |
|  | A-15 |  |  |  | 100 |
|  | 2-EHA | 50 |  |  |  |
|  | ACMO | 20 |  |  |  |
|  | NK-A-600 | 0.1 |  |  |  |
|  | IRG184 | 0.3 |  |  |  |
|  | Pentaerythritol triacrylate |  |  | 10 |  |
|  | Benzophenone |  | 0.5 | 0.5 |  |
|  | TPA-100 |  |  |  | 0.6 |
| Holding power of 0.5 Kg at 40° C. | Time | >24 h | >24 h | >24 h | >24 h |
|  | Rating | ⊙ | ⊙ | ⊙ | ⊙ |

TABLE 5-continued

|  |  | Example 20 | Example 21 | Example 22 | Example 23 |
|---|---|---|---|---|---|
| Adhesive force | Y(N/25 mm) | 27.5 | 11 | 8 | 9 |
|  | Adhesive residue | Absence | Absence | Absence | Absence |
|  | Rating | ⊙ | ⊙ | ⊙ | ⊙ |

ACMO: Acryloyl morpholine
NK-A-600: "NKester 600" trade name, manufactured by Shin-Nakamura Chemical Co., Ltd (polyethylene glycol#600 diacrylate)
IRG184: "IRGACURE184" trade name, manufactured by BASF (1-hydroxy-cyclohexyl-phenyl-ketone)
TPA-100: "DURANATE TPA-100" trade name, manufactured by Asahi Kasei Corporation (polyisocyanurate)

The invention claimed is:

1. An adhesive composition comprising a (meth)acrylic copolymer (A) having a mass average molecular weight of 50,000 to 1,000,000,
   wherein the (meth)acrylic copolymer (A) is obtained by polymerizing a monomer mixture comprising a macromonomer (a) having a number average molecular weight of 1,900 or more and 4,500 or less and a vinyl monomer (b),
   wherein the monomer (a) is represented by Formula (1):

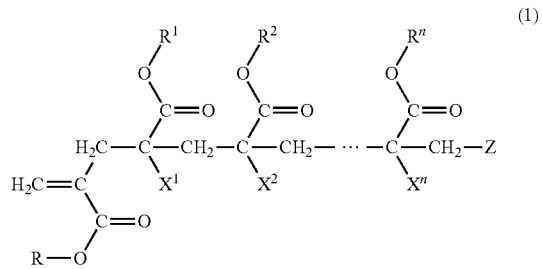

where in Formula (1),
n is 4 to 5,999;
each of R and $R^1$ to $R^n$ is independently a hydrogen atom, an alkyl group, a cycloalkyl group, an aryl group or a heterocyclic group, in which the alkyl group, the cycloalkyl group, the aryl group or the heterocyclic group optionally have a substituent;
each of $X^1$ to $X^n$ is independently a hydrogen atom or a methyl group; and Z is a terminal group of the macromonomer (a), wherein the (meth)acrylic copolymer (A) comprises 7 to 30% by mass of a repeat unit derived from the macromonomer (a), wherein the adhesive composition is in a solution state in the presence of at least one of a solvent and a liquid vinyl monomer, or is a hot melt-based adhesive composition without solvent.

2. The adhesive composition according to claim 1, wherein the (meth)acrylic copolymer (A) comprises 9 to 20% by mass of a repeat unit derived from the macromonomer (a).

3. The adhesive composition according to claim 1, wherein the glass transition temperature (Tga) of the macromonomer (a) is 30 to 120° C.

4. The adhesive composition according to claim 1, wherein the melt viscosity at 130° C. of the (meth)acrylic copolymer (A) is 20 to 800 Pa·s.

5. An adhesive sheet using the adhesive composition according to claim 1.

6. The adhesive composition according to claim 2, wherein the glass transition temperature (Tga) of the macromonomer (a) is 30 to 120° C.

7. The adhesive composition according to claim 2, wherein the (meth)acrylic copolymer (A) has a melt viscosity at 130° C. of 20 to 800 Pa·s.

8. The adhesive composition according to claim 3, wherein the (meth)acrylic copolymer (A) has a melt viscosity at 130° C. of 20 to 800 Pa·s.

9. An adhesive sheet using the adhesive composition according to claim 2.

10. An adhesive sheet using the adhesive composition according to claim 3.

11. An adhesive sheet using the adhesive composition according to claim 4.

12. An adhesive sheet using the adhesive composition according to claim 8.

13. The adhesive composition according to claim 1, wherein the macromonomer (a) has a number average molecular weight of 3,500 or less.

14. The adhesive composition according to claim 1, wherein the macromonomer (a) has a number average molecular weight of 2,600 or less.

15. The adhesive composition according to claim 1, wherein the terminal group of the macromonomer (a) is selected from the group consisting of a methacryloyl group, an acryloyl group, a vinyl group and a terminal polymerizable functional group represented by the following Formula (2):

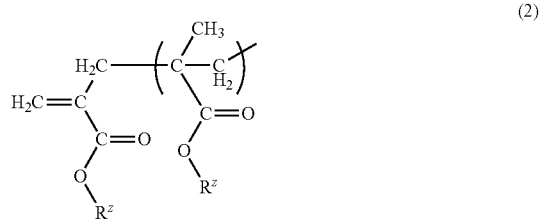

wherein $R^z$ represents R, $R^1$ to R″ in Formula (1).

16. The adhesive composition according to claim 1, wherein
the macromonomer (a) is obtained from methyl (meth)acrylate and isobornyl (meth)acrylate.

17. The adhesive composition according to claim 16, wherein
a ratio of methyl (meth)acrylate to isobornyl (meth)acrylate is approximately 50/50.

* * * * *